June 9, 1925.
L. O. DAVIS
CLUTCH
Filed May 9, 1923
1,541,748
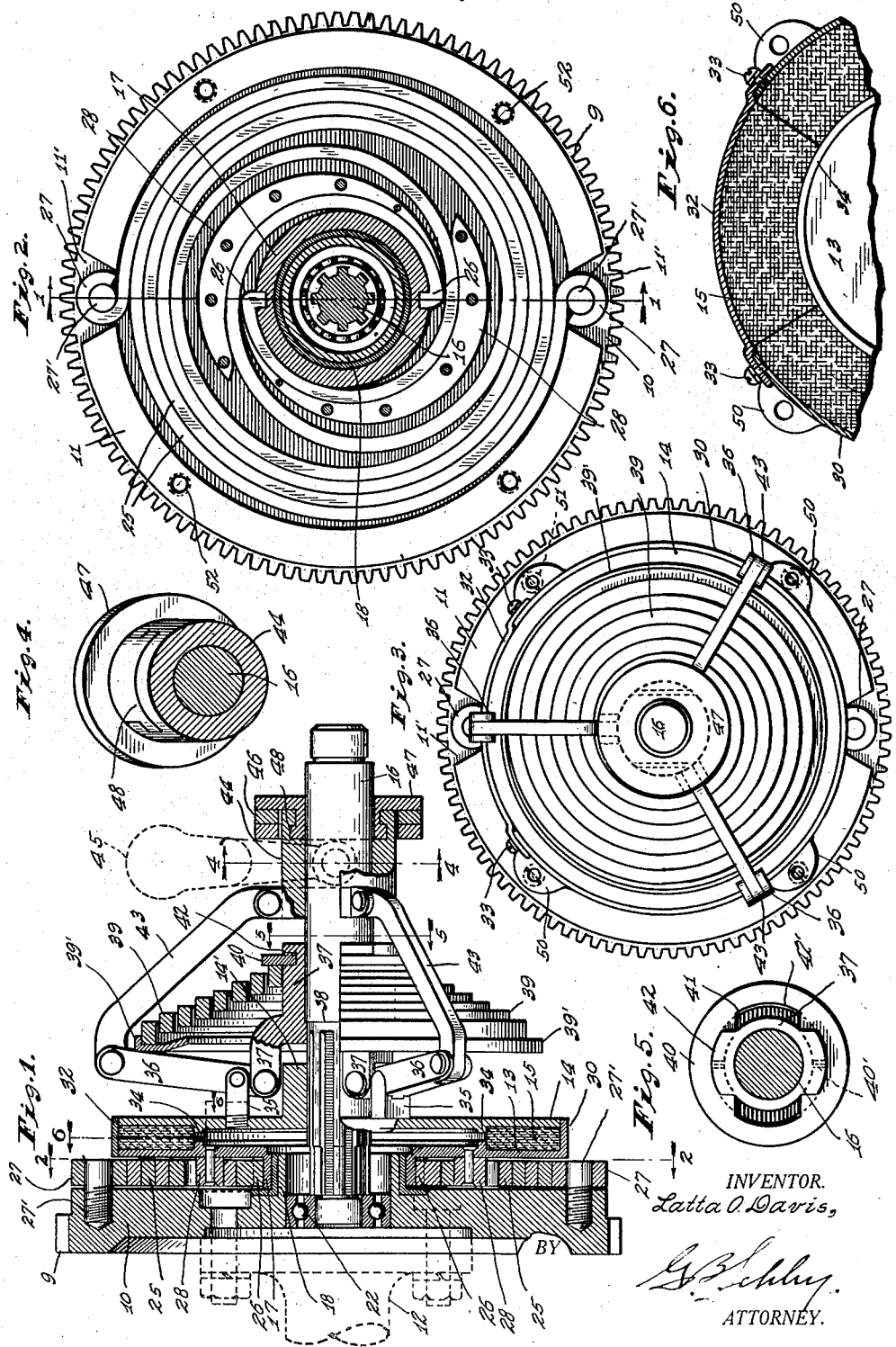
INVENTOR.
Latta O. Davis,
BY
ATTORNEY.

Patented June 9, 1925.

1,541,748

UNITED STATES PATENT OFFICE.

LATTA O. DAVIS, OF INDIANAPOLIS, INDIANA, ASSIGNOR TO WILLIAM M. FOGARTY, TRUSTEE, OF INDIANAPOLIS, INDIANA.

CLUTCH.

Application filed May 9, 1923. Serial No. 637,798.

*To all whom it may concern:*

Be it known that I, LATTA O. DAVIS, a citizen of the United States, residing at Indianapolis, in the county of Marion and State of Indiana, have invented a new and useful Clutch, of which the following is a specification.

It is the object of my invention to produce a clutch, especially an automobile clutch, in which there is a balanced cushioning spring associated with the clutch, for taking the shocks; in which the friction ring of the clutch is removable and replaceable in sections through an opening in a rim carried by one of the clutch members itself, so that the friction ring may be removed and replaced without requiring the entire dismantling of the clutch and its associated parts, and a worn-out friction ring may be replaced in much less time than has heretofore been necessary; in which the parts are rendered more accessible for assembly and repair; and in which the cushioning spring is mounted so that violent bending of any of its parts is prevented and thus fatigue and crystallizing of the metal is largely or wholly avoided and danger of breakage of the spring is materially lessened.

The present invention is a development and improvement of that shown in my co-pending application, Serial No. 581,301, filed August 12, 1922.

The accompanying drawing illustrates my invention: Fig. 1 is a longitudinal central section through a clutch embodying my invention, taken substantially on the line 1—1 of Fig. 2; Fig. 2 is a transverse section on the line 2—2 of Fig. 1; Fig. 3 is an end elevation, from the right of Fig. 1, and on a somewhat smaller scale; Fig. 4 is a sectional perspective with the section taken substantially on the line 4—4 of Fig. 1; Fig. 5 is a section on the line 5—5 of Fig. 1; and Fig. 6 is a fragmentary section substantially on the line 6—6 of Fig. 1.

The flywheel 10 may be in general of the usual type, and is shown as having an annular projecting rim 11 projecting a short distance from one face near the edge thereof, and as being non-integral with the engine shaft 12 (indicated in dotted lines), and as having peripheral teeth 9 for co-operating with the gear of a starting motor. These features, however, are not essential to my invention.

Axially on one side of the flywheel 10 is a clutch composed of two clutch members 13 and 14 and a floating friction ring 15 between them. The hub 14' of the clutch member 14 is splined on the clutch-shaft 16, so that by its movements along such shaft it will set and release the clutch. The clutch member 13 is provided with a hub 17 mounted on the outside of an annular flange 18 suitably carried by the flywheel 10 near its center, which flange 18 as shown is integral with the fly wheel 10 though that is not essential. The hub 17 can turn on the flange 18, by a limited relative angular movement, limited by the spiral springs later referred to. The clutch-shaft 16 preferably extends through the hub 17 and the flange 18, so that its end may be supported in a ball-bearing 22 at the center of the flywheel; the flange 18 being preferably sufficiently large to permit such ball-bearing to be inserted and removed through it.

The hub 17 is connected to the flywheel by a pair of spiral springs 25. These two spiral springs are similar, and are inter-coiled with each other, with their corresponding ends spaced 180° apart. The inner ends of the spiral springs 25 have inturned fingers 26 which are received in diametrically opposite notches in the outer face of the hub 17. The outer ends of the springs 25, according to my present invention, are not provided with hooks as are the inner ends, but are attached to the flywheel so that they may rock relatively thereto without bending the metal of the spring, so that fatigue and crystallization will be avoided. As shown, the outer ends of the springs are formed into eyes 27, which encircle pins 27' projecting from the face of the flywheel 10 near its edge, so that the eyes may rock on their pins as required by the movement of the springs. The eyes 27 with their pins 27' are preferably located in opposite notches 11' in the rim 11 when there is such a rim, to permit the outer ends of the springs to have as great a radius as possible; but I prefer to have the rim 11 overhanging the springs 25 to limit the expanding movement of such springs and form a housing for the springs. The coiling of the springs 25 is such that as the crankshaft 12 and flywheel 10 are turned by the engine they tend to wind up the springs 25;

and through them to drive the clutch-shaft 16. The notches 11' are narrower toward the inside than toward the outside, as is clear from Fig. 2, so that at the inside they are sufficiently narrow to prevent the eyes 27 from passing through them. In consequence, if for any reason a pin 27' should break, the eye 27 will still be retained in the notch 11', and the device will remain operative; and the eye will rock on the inner corner of the notch as on a knife-edge. Indeed, though I prefer to provide the pins 27', such pins may actually be omitted if desired, and the eyes 27 or similar spring-parts mounted to rock on such knife-edge.

The coil springs 25 are not uniformly coiled. They are coiled so that when at rest the greatest spacing between turns is toward the inside of the coil, as is clear from Fig. 2. As the springs are wound up by the torque between the crank-shaft 12 and the clutch-shaft 16, they coil more tightly about the hub 17, so that the spacing between turns of the coils travels outward toward the flywheel rim. As the outer turn of the coil rocks toward the center, the eye 27 rocks on its support, which is the pin 27' as shown. The first turn at the inside end of each coil at all times passes closely against the inturned finger 26 of the other coil, so that each coil holds the finger 26 of its companion in place in its notch of the hub 17 and does so more tightly as the springs are stressed. I prefer to provide crescent-shaped lugs 28 between the inmost half-turn or more of each coil 25 and the radially outward adjacent part of the other coil, to prevent undue bending of either spring over the finger 26 of its companion spring. This, in connection with the mounting of the eyes 27 so that they can swing, avoids any point of undue bending on the spring. Preferably the inner surface of each lug 28 at that end which is farther from the shaft-axis is rounded off to prevent any point of undue bending of the spring in case of reverse power-transmission; as when the car is coasting and driving the engine, and the engine is acting as a brake. The lugs 28 are suitably fastened to that face of the clutch member 13 which is toward the springs 25, so that they move angularly with the hub 17. By having the two springs 25, each connected at opposite points both to the flywheel 10 and to the hub 17, I get a balanced cushioning action free from any tendency to produce lateral movement between the shafts 12 and 16, so that the clutch-parts may be made lighter because they are free from unbalanced distorting stresses.

The friction ring 15 of the clutch is made in sections, as is clear from Fig. 6. Each section is in the shape of a sector of the ring, conveniently of about one-sixth or one-eighth the circumference, though the angular extent of a sector is immaterial. Each sector, in the form shown, comprises a single plate of friction material, though on this feature my co-pending application shows a structure in which each sector consists of a central metal plate faced with friction material on each side. My present invention is not concerned with this detail. The flywheel rim in the specific structure illustrated in my co-pending application extended over the clutch proper; but according to my present invention one of the clutch-members 13 and 14—here the clutch-member 13—has an annular rim 30, preferably integral, which overhangs the space between the two clutch-members 13 and 14 and thus lies radially outside of the friction ring 15, so that the overhanging of the flywheel rim over such ring 15 is not necessary. The rim 30 is preferably cut away at one point, for a slightly greater angular extent than the angular span of a sector of the friction ring 15; and this gap in the rim 30 may be covered by a removable rim-sector 32 in the plane of the friction ring 15. This rim-sector 32 overlaps the adjacent ends of the rim 30 where such rim ends at such cut-away part, and is suitably removably held in place, as by screws 33. By removing the screws 33, the rim sector 32 is loosened and may be removed; leaving an opening, which may be brought to the bottom to let the segments of the friction ring 15 drop out one at a time, by a relative rotation of the friction ring 15 and clutch-member 13, and which may be brought to the top to permit the dropping in of the segments of the friction ring one at a time. The segments are held from going too far in by annular flanges 34 on the adjacent faces of the clutch members 13 and 14. After the segments of the friction ring are put in place, the rim-sector 32 is put back in place and fastened there by the screws 33. This makes it possible to repair or replace the friction ring when it is worn, without dismantling the entire clutch, and thus reduces the labor bill for repairs to a small fraction of what it would otherwise be. The friction ring may be taken out or put back even though the axial faces of the flywheel and the clutch are totally inaccessible.

The relative movement between the clutch-members 13 and 14 as required for setting and releasing the clutch may be obtained in any suitable manner, but I prefer to use the arrangement illustrated in Fig. 1. In such arrangement, the clutch member 14 is provided with a series of attaching forks 35, conveniently screwed into such clutch member; these forks are pivoted to intermediate points on a similar circular series of radial levers 36. There may be any desired number of forks 35 and levers 36, from two up. The inner ends of the levers 36 are pivoted to a collar 37 which bears against a shoulder 38 on the clutch-shaft 16 and needs no other fastening. A coiled conical spring 39 co-axial with the clutch-shaft 16 bears against the levers 36 near their outer ends, conveniently through an interposed ring 39' to equalize the effect on the several levers, and acts between such levers and a ring 40 which is detachably mounted on one end of the collar 37. The mounting of the ring 40 is conveniently by a bayonet-joint arrangement, whereby the collar 37 has a peripheral groove near its end for receiving such ring, which groove opens to the end of the collar through two cut-away parts, leaving two opposite fingers 42 which may be made to register with similar openings 42' in the ring 40. If the fingers 42 and the openings 42' are set to mate, the ring 40 may be put on or taken off; but if they are turned crosswise, as shown in Fig. 5, the ring 40 is held from coming off. This kind of a joint can be used because the spring-pressure of the spring 39 is always acting on the ring 40. To prevent the ring 40 from turning the abutting faces of such ring and the fingers 42 are provided with mating projections and depressions, such as radial ribs and grooves 40', as indicated in Fig. 5. The spring 39 may be assembled on the collar 37, and the whole slipped in place as a unit. This greatly facilitates assembling. The action of the spring 39 keeps the collar seated against the shoulder 38.

The outer ends of the levers 36 are connected by links 43 to a clutch-actuating sleeve 44 slidable on the clutch-shaft 16 and suitably operated by the fork 45 of the usual clutch-pedal (not shown), conveniently with a thrust-bearing 46 interposed between the fork 45 and a suitable flange 47 on such clutch-actuating sleeve. When the clutch-pedal is depressed, the outer ends of the levers 36 are drawn rearward, to compress the spring 39 and release the friction ring 15 of the clutch, thus releasing the clutch. When the clutch-pedal is allowed to rise, the resultant expansion of the spring 39 forces the outer ends of the levers 36 forward to move the clutch-members 13 and 14 together to grip the friction-ring 15 and thus set the clutch. The whole clutch-actuating mechanism may be assembled on the clutch-member 14, and slid on the clutch-shaft 16 as a unit; and no other fastening is required than the reaction of the parts themselves.

The flange 47 is conveniently made as a removable flange, which is separable from the sleeve 44. A convenient method of fastening is by a transverse undercut tongue 48 carried by the flange and mating with a similar undercut groove across the end of the sleeve 44, as is clear from Figs. 1 and 4. When the two parts 44 and 47 are put together with this tongue-and-groove mounting, and placed on the clutch-shaft 16, such clutch-shaft locks them together.

In order to provide for emergencies, in case the springs 25 should break, I preferably provide some means for connecting the clutch-member 13 directly to the flywheel 10 independently of such springs. While this may be done in various ways, a convenient way is to provide outwardly extending fingers 50 on the clutch-member 13, in which fingers are holes for receiving suitable screws 51, which may be screwed into suitably threaded holes 52 in the flange 11 of the flywheel. There may be any desired number of these fingers and holes.

I claim as my invention:—

1. In combination, a clutch having a plurality of engageable and disengageable members, a member co-axial with said clutch, and a plurality of inter-coiled spiral springs between one of said clutch members and said co-axial member, the outer ends of said springs being connected to one and the inner ends to the other of the two members connected by said springs, the outer end of each spring being formed into an eye, and a pin projecting through each eye into the part to which such outer end is connected to provide a pivotal mounting for such outer end, the part connected to said outer spring-ends being provided with a rim which peripherally overhangs said springs, and said rim being cut away where the eyes in the outer ends of the springs are located to provide gaps of sufficient width to receive such eyes and permit their turning therein.

2. In combination, a clutch having a plurality of engageable and disengageable members, a member co-axial with said clutch, and a spiral spring between one of said clutch members and said co-axial member, the outer end of said spring being connected to one and the inner end to the other of the two members connected by said spring, the outer end of said spring being formed into an eye, and a pin projecting through said eye into the part to which such outer end is connected to provide a pivotal mounting for such outer end, the part connected to said outer spring-end being provided with a rim which peripherally overhangs said spring, and said rim being cut away where the eye in the outer end of the spring is located to provide a gap of sufficient width to receive such eye and permit its turning therein.

3. In combination, a clutch having a plurality of relatively movable parts, one or more spiral springs connected at their inner ends to one of said clutch-parts, a member co-axial with said clutch and having a rim within which said spring or springs are located, the outer end of each said spring being provided with an outwardly turned eye, said rim being provided with an outwardly flaring notch for each spring, and said eye being located in said notch and freely oscillatable therein.

4. In combination, a clutch having a plurality of relatively movable parts, one or more spiral springs connected at their inner ends to one of said clutch-parts, a member co-axial with said clutch, a pivot pin by which the outer end of each spring is pivotally connected to said member, and reserve means for catching and holding each outer spring-end and for permitting it to oscillate relatively to said member in case the pivot pin breaks.

5. In combination, a clutch having a plurality of relatively movable parts, one or more spiral springs connected at their inner ends to one of said clutch-parts, a member co-axial with said clutch and having a rim within which said spring or springs are located, the outer end of each said spring being provided with an outwardly turned eye, said rim being provided with a notch for each spring, each such notch being provided at its inner end with an acute-angle edge upon which the out-turned spring eye may catch, and said eye being located in said notch and freely oscillatable therein.

In witness whereof, I have hereunto set my hand at Indianapolis, Indiana, this 4th day of May, A. D. one thousand nine hundred and twenty three.

LATTA O. DAVIS.